Oct. 14, 1969   F. A. GEHRET   3,472,519
SEAL FOR ROLLING BEARINGS
Filed Feb. 13, 1967
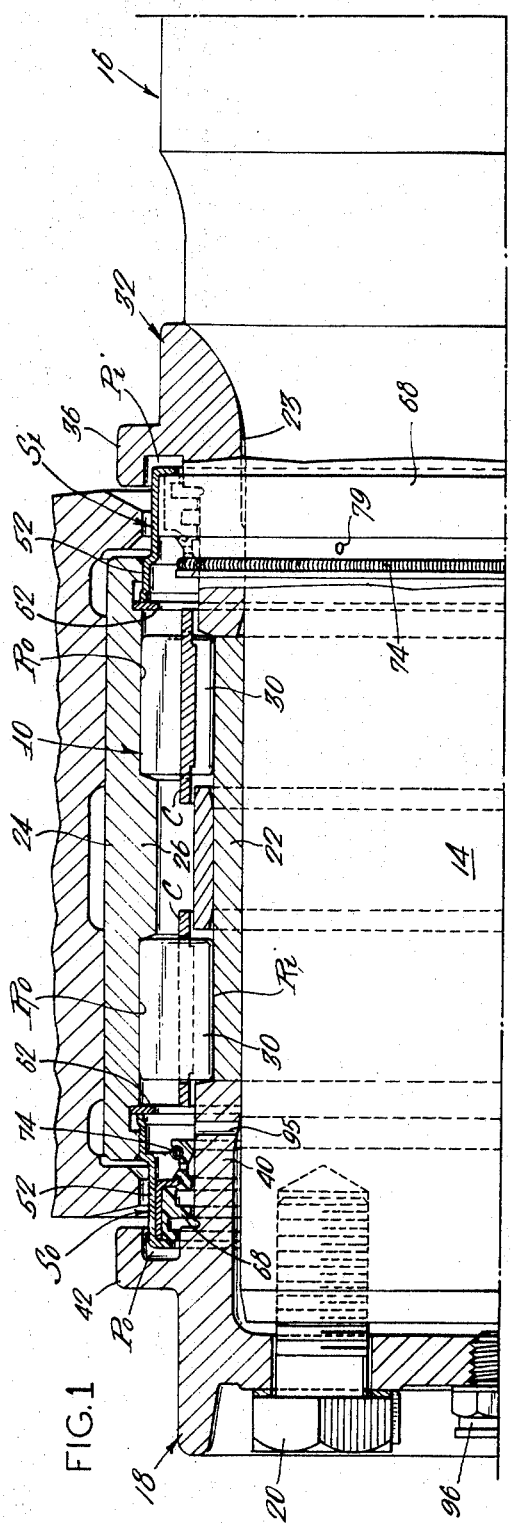
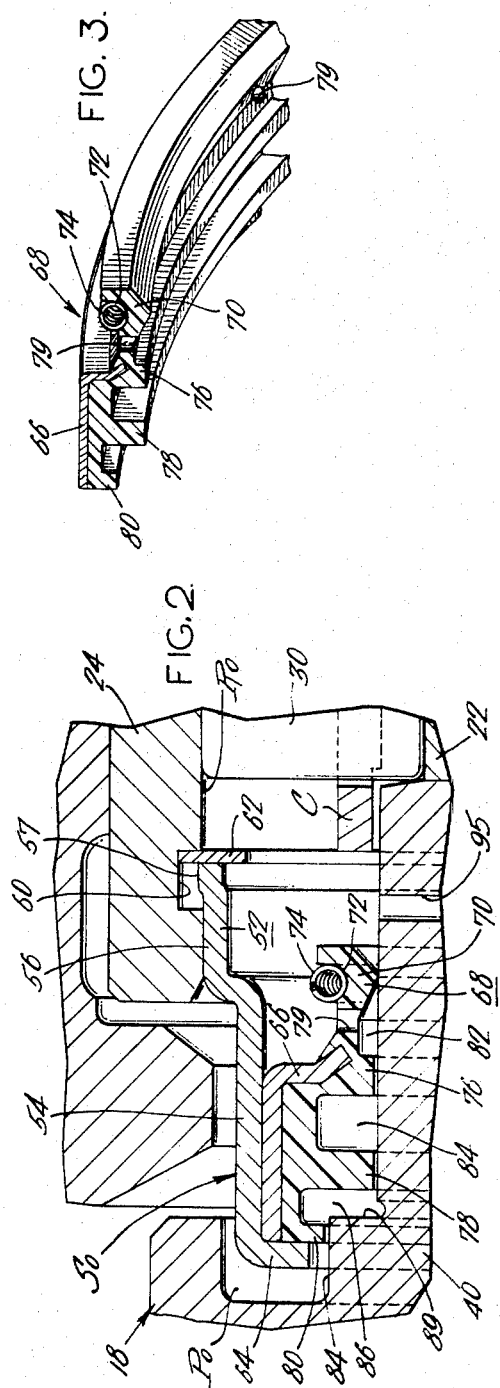
INVENTOR:
FREDERICK A. GEHRET
BY
Howson & Howson
ATTYS.

United States Patent Office 3,472,519
Patented Oct. 14, 1969

3,472,519
SEAL FOR ROLLING BEARINGS
Frederick A. Gehret, Norristown, Pa., assignor to SKF Industries, Inc., King of Prussia, Pa., a corporation of Delaware
Filed Feb. 13, 1967, Ser. No. 615,552
Int. Cl. F16j 15/32, 15/44
U.S. Cl. 277—59                              8 Claims

ABSTRACT OF THE DISCLOSURE

A seal for rolling bearing assembly having an outer cup-like shroud adapted to be snapped in place in an annular groove in an outer ring of the bearing, a metallic insert, press-fitted in the shroud, supporting a resilient sealing element formed integrally with the insert. The sealing element comprises a plurality of radially inwardly directed axially spaced flanges or ribs defining in the present instance three annuar chambers. The innermost rib presses against the wear surface to seal the inside of the bearing and the other flange are spaced from the wear surface. Fluid communication between the inside of the bearing and one of the chambers is provided through vent holes to permit accumulation of lubricant in one of the chambers which mixes with any contaminants which enter the seal from outside the bearing.

---

This invention relates to a seal for rolling bearings and particularly to a seal for use in cylindrical rolling bearing assemblies adapted for use in railway car truck journals.

In these applications, the rolling bearing assembly is mounted on the trunnion-like journal of the axle of a railway car truck journal and is tightly clamped thereto by means of an end cap secured in place by bolts. The rolling bearing assembly, which is usually a double-row cylindrical rolling bearing, comprises an inner ring and an outer ring having a central, built-up portion or annual rib separating the pair of raceways and a plurality of rollers in the space between the rings arranged in two side-by-side rows. A collar and axle cap are mounted at opposite ends of the inner ring, the collar being press-fitted on the inner portion of the journal at the inner end of the inner ring and the cap located adjacent to the outer end of the inner ring. The assembly further includes a spacer ring disposed between the rows of roller and a cage to space the rollers in each row. Lubricant sealing devices are provided at opposite axial ends of the bearing assembly.

A typical type of prior lubricant seal is the type illustrated in the Purdy Patent No. 3,268,278 which has an inner lip pressed against the wear ring by means of a garter spring and an outer lip which lightly engages the outer peripheral surfaces of the cap and collar extensions adjacent opposite axial ends of the bearing assembly. These seals are designed to retain the lubricant within the bearing assembly for the purpose of lubricating moving parts of the assembly such as the rolling elements and exclude foreign matter from entering the bearing.

Even though these prior assemblies are generally effective to achieve this purpose, there are a number of disadvantages in the particular construction of the seal. For example, an external contact lip causes high overall bearing operating temperatures and increases the overall bearing torque. The shape of the contact lip is usually a thin section terminating in a sharp edge to minimize operating temperature and because of the exposure to dirt, the narrow lip section tends to wear rapidly. Further, dirt accumulating in the lip wears a groove in the peripheral surfaces of the cap and collar extensions and thus, by reason of the contact lip wear and grooving of these surfaces, a simple labyrinth develops which is not effective to exclude foreign matter from contacting the internal grease retention lip. Additionally, since the seal lip must be thin, flexible and extend outwardly, there is always danger of a turned under lip during assembly of the cap and collar which affects the proper operation of the seal.

The present invention provides a seal which is characterized by novel features of construction and arrangement designed to overcome the functional and operational disadvantages of prior seals to produce an efficient, cool running, low torque lubricant and dirt seal especially designed for use in freight car journal roller bearings. The seal comprises an outer shroud made of metal which is adapted to be snapped in place in outer axial ends of the outer ring, a seal element insert press-fitted in the shroud to which is integrally secured the resilient sealing member. This resilient sealing member comprises an inner grease-retaining lip of generally V-shaped cross section which is pressed against the wear ring by means of a grease-retaining lip spring, an inner vertical separator in the form of a first annular flange spaced outwardly from the grease-retaining lip to define an inner chamber or groove and a plurality of grease vent holes in the wall between the grease-retention lip and inner vertical separator. The resilient member further includes an intermediate vertical separator in the form of an annular flange or rib axially spaced from the inner vertical separator defining a central shorter radial depth defining an outer most annular chamber.

In operation, therefore, this seal functions as follows. The internal spring-loaded lip retains lubricant in the normal manner. Small amounts of the grease, however, are allowed to pass into the innermost chamber or channel through the vent holes communicating with the innermost annular channel and the interior of the bearing. A slight amount of the excess grease will pass through the clearance between the inner vertical separator from the innermost chamber to the central chamber. Most of the foreign matter entering from the outside of the bearing will enter and collect in the outer annular chamber and any contaminants progressing inwardly will collect in the central chamber where it will mix with the accumulated grease.

The size of the central chamber allows the collection and storage of all foreign matter normally encountered from one bearing inspection to the next and serves effectively to retard progression of contaminants beyond this point. Of course, this is important in excluding foreign matter from mixing with the grease or lubricant in the bearing which would tend to result in wear of the bearing parts and the failure thereof. Further, this feature combined with the vent holes allows the bearing to breathe and equalize any internal pressure differential without contaminating the bearing.

The seal of the present invention provides the following advantages. The overall running temperature of the bearing will be reduced considerably, the overall bearing torque will be less and since there is no contact between the labyrinth portion of the seal and the peripheral surfaces of the cap and collar extensions, no wear results, and accordingly, the life of the seal is extended considerably. Further, since only a portion of the cap and collar extensions under the internal spring-loaded lip is contacted by the seal, this is the only portion of the extensions that has to be hardened. Furthermore, the overall assembly of the bearing is simplified considerably, that is, the cap and collar extensions can be made without special provision for entry into the seal, danger of turnedunder lips is eliminated and application of the cap and collar is simplified.

These and other objects of the present invention and various specified details of construction of a bearing seal in accordance with the present invention are hereinafter more fully set forth with reference to the accompanying drawing, in which:

FIG. 1 is a fragmentary sectional view of a railway truck journal on which is mounted a double-row cylindrical roller bearing including a seal construction in accordance with the present invention;

FIG. 2 is an enlarged fragmentary sectional view of the seal; and

FIG. 3 is a fragmentary perspective view of a seal constructed in accordance with the present invention.

Referring now to the drawing there is illustrated a rolling bearing assembly 10 incorporating seal $S_i$ and $S_o$ constructed in accordance with the present invention. The bearing assembly illustrated is mounted on a trunion-like journal 14 of the axle 16 of a railway car truck journal. The rolling bearing assembly circumscribes and encloses the entire journal 14 and is fixed in position on the journal by means of an axle cap 18 and a plurality of bolts 20.

In the present instance, the rolling bearing assembly illustrated is a double-row cylindrical roller bearing. However, it is to be understood that even though the seal of the present invention has particular usefulness and adaptability of this type bearing assembly, it also may be used in other types of bearing for use in other applications. The bearing assembly 10 comprises an inner ring 22, the outer surface of which defines the inner raceway $R_i$, an outer ring 24 having a central circumferentially extending rib 26 serving as a dividing section for the pair of outer raceways $R_o$ and a plurality of rollers 30 in the space between the rings arranged in two side by side rows. A conventional cage 1 circumferentially spaces and guides the rollers of each row. The inner end of the bearing assembly abuts an annular member in the form of a collar 32 mounted adjacent the inner end of the journal, the collar as illustrated, having a curved circumferentially extending surface 23 which confronts and conforms to the curved end of the journal. The collar 32 also has an inner extension which underlies a portion of the outer ring and defines a circumferentially extending wear surface which the inner seal $S_i$ confronts and a radial inverted L-shaped projection 36 defining a labyrinthian path $P_i$ between the seal and projection. In the present instance, the cap 18 has a cylindrical inwardly projecting extension 40 abutting the outer axial end of the inner ring 22 and the outer wear surfaces of which is confronted by the outer seal $S_o$ and an inverted L-shaped projection 42 again providing a labyrinthian path $P_o$ between the seal and projection.

In accordance with the present invention there is provided a seal for the bearing which is characterized by novel features of construction and arrangement producing many functional and operational advantages in the overall operation of the bearing which are noted above. In the bearing illustrated, seals $S_i$ and $S_o$ are provided at each end and are identical in construction so that the same reference numerals are applied to each seal. The seal comprises a seal shroud 52 made of metal which is generally of S-shaped configuration consisting of offset inner and outer generally cylindrical portions 54 and 56 respectively. The outer portion 56 has a slightly raised bead 57 at its axially inner peripheral edge which permits the shroud to be snapped in place in an annular groove 60 spaced radially inwardly from the outer axial end of the outer ring and which in turn presses a snap ring 62 against one edge of the annular groove 60. The outer end of the outer cylindrical portion 54 terminates in a radially inwardly directed flange 64. A seal element insert 66 which also may be made of metal is mounted interiorly of the shroud and is suitably dimensioned to be press fitted therein. The seal element insert 66 supports the resilient sealing element 68 which may be suitably molded thereto. The resilient sealing element 68 includes a grease-retaining lip 70 having a V-shaped interior edge portion engaging the cap extension 40 and a circumferentially extending groove 72 on its outer face within which is mounted a garter spring 74 to press the grease-retaining lip 70 against athe outer surface of extension 40.

The seal also includes, in the present instance, three radially extending inwardly projecting axially spaced separator ribs or flanges, an inner flange 76, a central flange 78 and an outer flange 80, which define several annular chambers or pockets. Thus, an inner annular chamber 82 is defined between the inner flange 76 and grease retaining lip 70, a central chamber 84 is defined by the inner flange 76 and central flange 78 and an outer chamber 86 is defined between the outer flange 80 and the central flange 78. A plurality of circumferentially spaced radial vent holes 79 are provided in the axial wall of the sealing member 68 connecting the grease-retaining wall of the sealing member 68 connecting the grease-retaining lip 70 and inner flange 76 to provide limited fluid communication between the interior of the bearing and inner chamber 82. In the present instance the outer flange 80 is of shorter depth than the other flanges and confronts a stepped portion 84 of the cap, a radial wall 89 of the stepped portion, therefore, defining a wall portion of the outer chamber 86. innermost edge of the flanges 76 an 78 are spaced slightly Further, as illustrated, in the assembled relation the from the peripheral surface of the extension 40 and the outer flange 80 is spaced from the lower wall of the labyrinthian pocket $P_o$.

In operation, therefore the seal functions as follows in a bearing assembly as described above and as shown in the drawing. The spring biased grease retaining lip 70 normally exerts a pressure on the outer surface of extension 40 and thus serves to retain lubricant in the bearing assembly. It is noted, however, that small amounts of lubricant such as grease accumulate in the chamber 82 through the vent holes 79 in the wall between the grease retaining lip 70 and the inner flange 76. In turn a slight amount of lubricant from the inner chamber 82 will pass through the clearance between the flange 76 and outer surface of extension 40 to the central chamber 84. Accordingly, in operation, any foreign matter which would tend to enter the bearing through the labyrinthian path at opposite ends of the bearing will collect in the outer chamber 86. By this arrangement, any foreign matter or contaminants moving inwardly from the outer chamber 86 can bypass the clearance between the central flange 78 and accumulate in the central chamber 84 where it will mix with the accumulated lubricant or grease. The size of the central chamber 84 is sufficiently large to allow the collection and storage of all foreign matter normally encountered from one bearing inspection to the next. Further, progression of the contaminants through the seal is resisted by mixing with grease in the central chamber 84 and accordingly the bearing remains clean. This feature, combined with the vent holes 79, also allows the bearing to "breathe" and equalize any internal pressure differentials without contaminating the bearing. Other operational advantages due to the use of the seal of the present invention in a bearing of the above type is that the overall running temperature of the bearing is reduced and bearing torque will be low. Further, since there is no contact between the labyrinth portion of the seal, that is the flanges 76, 78 and 80, and the extension 40, wear of the assembly is minimized and hence there is a longer seal life. Additionally since only the grease retaining lip engages the wear surface of extension 40, it is only necessary to harden this portion of the cap or collar. It is noted that in the present instance the bearing may be lubricated through a grease port and fitting 96 in the end cap 18 whereby lubricant enters the bearing through a radial port 95 in the cap extension 40.

While a particular embodiment of the present invention has been illustrated and described herein, it is of course to be understood that changes and modifications may be made therein within the scope of the following claims.

I claim:

1. A rolling bearing assembly mounted on a shaft having an annular portion defining a wear surface comprising inner and outer rings spaced apart to define an annular space for a plurality of rolling elements, said annular space also defining a lubricant chamber for a lubricant, a seal assembly mounted at least at one end of said bearing assembly to seal the annular space, said seal comprising an annular support member detachably secured to the outer ring, and a resilient sealing element carried by said support member, said resilient sealing element including at one end a circumferentially extending grease retaining lip engaging the wear surface, an inner flange spaced from the grease-retaining lip and defining an inner circumferentially extending chamber, a central flange spaced from the inner flange and defining a central annular chamber and an outer flange spaced from the central flange defining an outer annular chamber, said inner, central and outer flanges being spaced from said wear surface to provide limited communication between the chambers, and means defining a plurality of circumferentially spaced radial openings in the axial wall of the resilient sealing element providing fluid communication between said lubricant chamber and said inner chamber to permit flow of lubricant to said inner chamber.

2. A rolling bearing assembly as claimed in claim 1 wherein said support member comprises a seal shroud adapted to be detachably secured to the outer ring and a seal element insert mounted in said shroud, said resilient sealing element being attached to said seal element insert.

3. A rolling bearing assembly as claimed in claim 1 wherein said grease retaining lip has a V-shaped interior edge portion and including spring biasing means for pressing said grease retaining lip against said wear surface.

4. A seal assembly as claimed in claim 2 wherein said spring biasing means comprises a garter spring seated in a curved groove in the outer surface of said resilient member outboard of said V-shaped inner edge portion of said grease retaining lip.

5. A seal assembly as claimed in claim 2 wherein said shroud includes a circumferentially extending radially outwardly directed rib adapted to engage in a groove in the outer ring to hold the seal assembly in place.

6. A seal assembly as claimed in claim 2 wherein said shroud and seal insert are made of metal and wherein said seal insert is press fitted in said shroud.

7. A rolling bearing assembly as claimed in claim 1 wherein said annular member includes a circumferentially extending inverted L-shaped radial projection defining a labyrinthian path between said seal assembly and said radial projection.

8. A rolling bearing assembly as claimed in claim 7 wherein said annular member has a circumferentially extending raised shoulder inboard of said inverted L-shaped radial projection and the outer flange of said resilient sealing element is of shorter radial dimension that the other flanges and confronts said shoulder.

References Cited

UNITED STATES PATENTS

| | | | |
|---|---|---|---|
| 2,879,114 | 3/1959 | Bowen | 277—153 X |
| 3,044,786 | 7/1962 | Chillson | 277—75 X |
| 3,207,521 | 9/1965 | Dega | 277—153 X |

FOREIGN PATENTS

| | | |
|---|---|---|
| 554,331 | 6/1943 | Great Britain. |
| 1,012,939 | 12/1965 | Great Britain. |

LAVERNE D. GEIGER, Primary Examiner

JEFFREY S. MEDNICK, Assistant Examiner

U.S. Cl. X.R.

277—75, 153, 235; 308—187, 187.1